(12) United States Patent
Uhari

(10) Patent No.: US 10,154,125 B2
(45) Date of Patent: Dec. 11, 2018

(54) APPARATUS HAVING A PLURALITY OF SIMS

(71) Applicant: UROS OY, Oulu (FI)

(72) Inventor: Tommi Uhari, Oulu (FI)

(73) Assignee: UROS TECHNOLOGY S.À R.L., Ettelbruck (LU)

( * ) Notice: Subject to any disclaimer, the term of this patent is extended or adjusted under 35 U.S.C. 154(b) by 54 days.

(21) Appl. No.: 13/826,127

(22) Filed: Mar. 14, 2013

(65) Prior Publication Data

US 2013/0260831 A1 Oct. 3, 2013

(30) Foreign Application Priority Data

Mar. 29, 2012 (EP) ..................................... 12162047

(51) Int. Cl.
*H04M 1/02* (2006.01)
*H04B 1/3816* (2015.01)
(Continued)

(52) U.S. Cl.
CPC ........ *H04M 1/0274* (2013.01); *G06K 19/077* (2013.01); *H04B 1/3816* (2013.01);
(Continued)

(58) Field of Classification Search
CPC ..... H04W 12/06; H04W 12/08; H04W 12/10; H04W 12/02; H04W 4/003; H04W 4/24; H04W 88/06; H04W 8/183; H04W 92/08; H04W 4/60; G06K 19/07; G06K 19/0719; G06K 19/077; G06K 19/07732; G06K 19/07743; G06K 19/0723; H04M 1/72519;
(Continued)

(56) References Cited

U.S. PATENT DOCUMENTS 5,933,785 A 8/1999 Tayloe
6,212,372 B1 4/2001 Julin
(Continued)

FOREIGN PATENT DOCUMENTS

DE 197 37 565 A1 3/1999
DE 198 23 074 A1 11/1999
(Continued)

OTHER PUBLICATIONS

European Search Report issued in European Patent Application No. 12 16 2047 dated Jul. 9, 2012.
(Continued)

*Primary Examiner* — Allahyar Kasraian
(74) *Attorney, Agent, or Firm* — Oliff PLC

(57) ABSTRACT

An apparatus is removably attachable to an electronic device associated with wireless communication. The apparatus includes an operational circuitry which includes contact means, memory means and data processing means. The contact means is for electrical coupling between the electronic device and the operational circuitry. The memory means is capable of storing subscriber-identity-module-specific data of at least two subscriber identity module associated with at least one operator of wireless communication for causing the apparatus to act as a plurality of the subscriber identity modules of the at least one operator when in use.

13 Claims, 11 Drawing Sheets

(51) Int. Cl.
*H04M 17/00* (2006.01)
*H04W 4/60* (2018.01)
*G06K 19/077* (2006.01)
*H04M 1/725* (2006.01)

(52) U.S. Cl.
CPC ......... *H04M 1/026* (2013.01); *H04M 17/103* (2013.01); *H04W 4/60* (2018.02); *H04M 1/0277* (2013.01); *H04M 1/72519* (2013.01); *Y10T 29/49117* (2015.01)

(58) Field of Classification Search
CPC .. H04M 1/7253; H04M 1/026; H04M 1/0274; H04M 1/0277; H04M 17/103; H04B 1/3816
USPC .......... 455/558, 410, 411, 418, 434
See application file for complete search history.

(56) References Cited

U.S. PATENT DOCUMENTS

| | | | |
|---|---|---|---|
| 6,623,305 B2* | 9/2003 | Chun-Lung | 439/630 |
| 6,856,818 B1 | 2/2005 | Ford | |
| 6,978,156 B1 | 12/2005 | Papadopoulos et al. | |
| 7,613,480 B2* | 11/2009 | Brown | 455/558 |
| 2002/0023963 A1* | 2/2002 | Luu | G06K 19/0719 235/492 |
| 2004/0192386 A1* | 9/2004 | Aerrabotu | H04M 15/00 455/558 |
| 2004/0210715 A1* | 10/2004 | Harari | G06K 19/07 711/115 |
| 2005/0164737 A1* | 7/2005 | Brown | H04W 8/245 455/558 |
| 2009/0181721 A1* | 7/2009 | Nishizawa et al. | 455/558 |
| 2009/0257590 A1* | 10/2009 | Ding | H04L 9/0825 380/247 |
| 2009/0325572 A1* | 12/2009 | Ji | H04W 24/06 455/424 |
| 2010/0060595 A1* | 3/2010 | Lee et al. | 345/173 |
| 2010/0165589 A1* | 7/2010 | Zhou | G06K 7/0021 361/759 |
| 2011/0070922 A1* | 3/2011 | Kim | 455/558 |
| 2011/0117964 A1* | 5/2011 | Luo | 455/558 |
| 2011/0314374 A1* | 12/2011 | Chae | 715/702 |
| 2012/0064945 A1* | 3/2012 | Kim | G06F 9/441 455/558 |
| 2012/0108294 A1* | 5/2012 | Kaul | 455/558 |

FOREIGN PATENT DOCUMENTS

| | | |
|---|---|---|
| DE | 100 54 379 A1 | 5/2002 |
| DE | 10 2006 024 556 A1 | 1/2008 |
| WO | WO 99/62282 | 12/1999 |

OTHER PUBLICATIONS

Office Action dated Aug. 28, 2014 issued in European Patent Application No. 12 162 047.0.

* cited by examiner

APPARATUS HAVING A PLURALITY OF SIMS

FIELD

The invention relates to apparatus having multiple SIMs.

BACKGROUND

First mobile phones had one subscriber identity module (SIM) card. Since then the number of SIM cards has increased. A present mobile phone may have dual or triple SIM cards. Although a large number of SIMs could bring many advantages, a large number of SIM cards cannot be arranged in a mobile phone because of mechanical and designing problems associated with a thin and pocket sized device that is all the time carried with in variable and potentially in rough conditions. Hence, there is a need for better solutions.

BRIEF DESCRIPTION

According to an aspect of the present invention, there is provided a card, an apparatus, and a method as specified in the claims.

The card, apparatus and methods in the presented claims are responses to the need for a large number of real or virtual subscriber identity modules in a compact, reliable and user friendly form for a portable device.

LIST OF DRAWINGS

Example embodiments of the present invention are described below, by way of example only, with reference to the accompanying drawings, in which FIG. 1 illustrates a card with a plurality of SIM chips;

Figure 12:
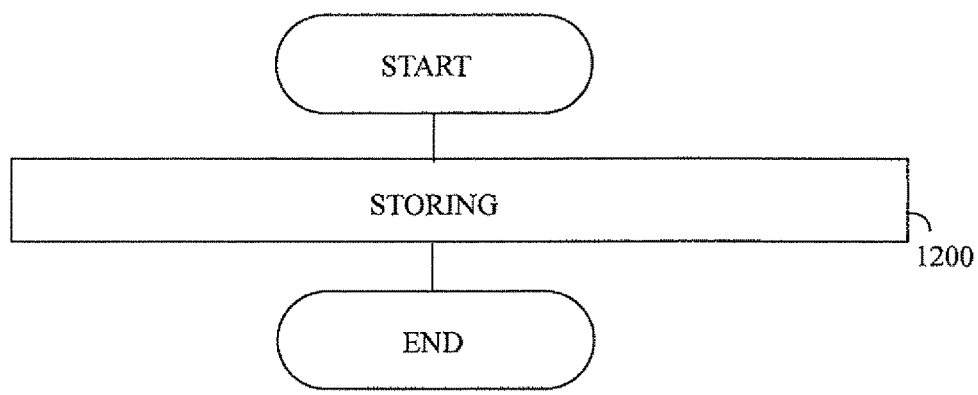
Figure 13:
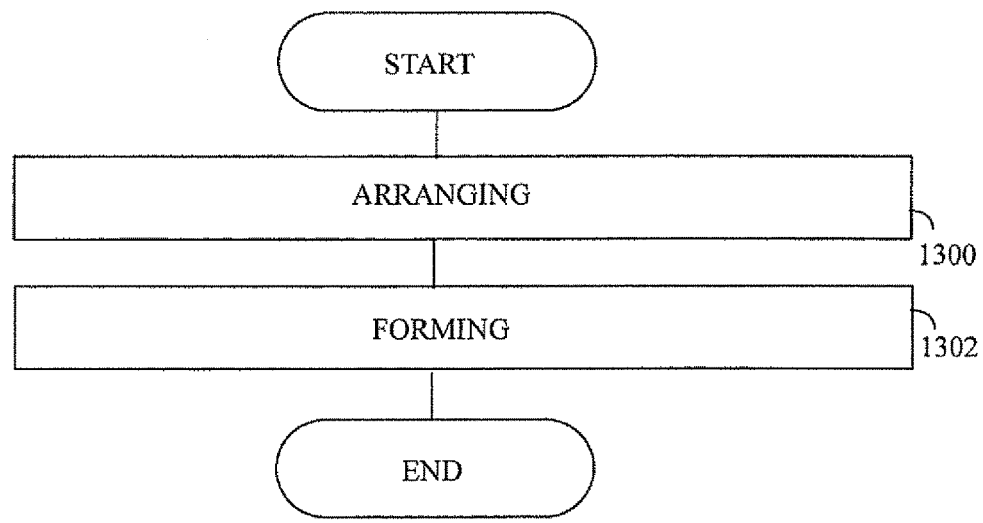
Figure 14:
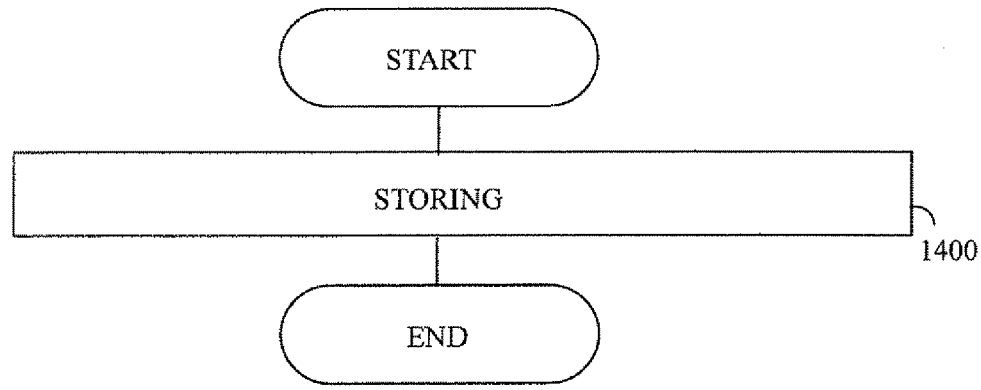

FIG. 12 presents a flow chart of a manufacturing method of a card with real or virtual SIMs;

FIG. 13 presents a flow chart of a manufacturing method of a card with real SIMs; and FIG. 14 presents a flow chart of a manufacturing method of a card with virtual SIMs.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while FIGS. 1 to 11 illustrate various embodiments, they are simplified drawings that only show some structures and functional entities. It is apparent to a person skilled in the art that the described cards and equipment may also comprise other functions and structures. It should be appreciated that details of some functions, structures, and the protocols used for communication are irrelevant to the actual invention. Therefore, they need not be discussed in more detail here.

Figure 1:
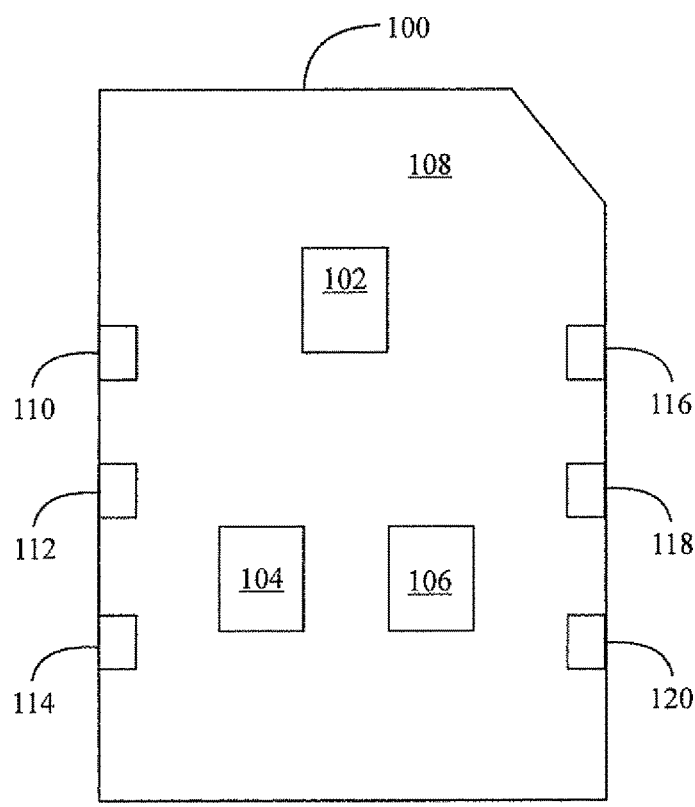

In an embodiment shown in FIG. 1, a card 100 comprises a plurality of separate subscriber identity module chips 102, 104, 106. Although the subscriber identity module chips 102 to 106 are separate they are physically integrated in one card 100 which contains them. The carrier structure 108 of the card 100 may be plastic such as polyvinyl chloride, polycarbonate or acrylonitrile butadiene styrene but the carrier 108 is not limited to these materials. In general, the card 100 comprises an operational circuitry which comprises contact pins 110, 112, 114, 116, 118, 120, at least one memory and at least one processor for processing digital data.

The card may have the same size as prior art SIM cards. The size of the card 100 may be 85.60 mm×53.98 mm×0.76 mm, for example which is the size of a credit card. Alternatively, the card 100 may be considerably smaller, 25 mm×15 mm×0.76 mm, for example which is the size of a newer mini-SIM card. Still, the size of the card 100 may be 15 mm×12 mm×0.76 mm, for example which is the size of a micro-SIM card, is even smaller. Naturally, these measures are only examples and hence the size of the card 100 is not limited to these. It is also to be noted than one physical SIM card may include a number of different subscriptions: one SIM card may be a multi-IMSI SIM card having many different subscriber identities in the same card.

A processor may be realized as an electric circuit of a digital state machine performing logic operations on the basis of instructions of a computer program. In the example of FIG. 1, the operational circuitry of the card 100 comprises electrical circuits of the subscriber identity module chips 102 to 106 and conductors between the contact pins 110 to 120 and the chips 102 to 106. Each of the subscriber module chips 102 to 106 acts as a real/concrete subscriber identity module.

Figure 2:
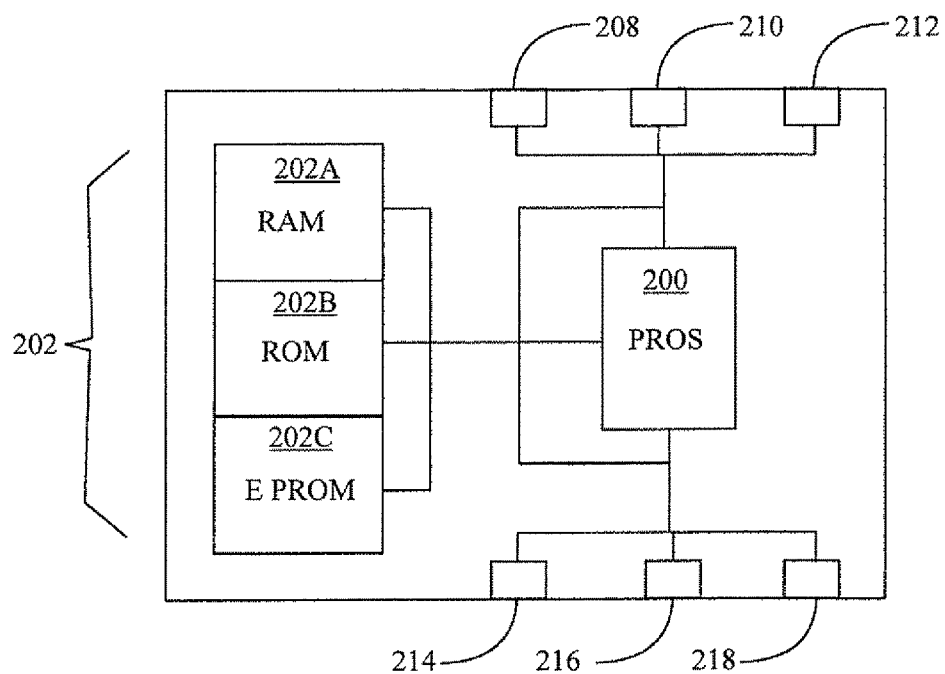
FIG. 2 illustrates an operation circuitry of a card with a plurality of real or virtual SIMs.

FIG. 2 presents a structure of subscriber identity module chip. The chip comprises at least one processor 200, at least one memory 202 and electrical contacts 208, 210, 212, 214, 216 and 218. A first memory 202A of the at least one memory 202 may be for storing data such as operator-specific data and/or user-specific data and it may be protected such that it is accessible only by an operator and/or by a service provider. The second memory 202B may be a working memory for a program in use at a particular moment. The third memory 202C may store the computer programs that are used by the at least one processor 200. This memory 202C may also be protected and allowed to be used only by an operator and/or by a service provider. The electric contacts 208 to 218 may connect the at least one processor 200 with the contact pins 110 to 120, and the at least one memory 202 may be coupled with the processor 200. Alternatively, the electric contacts 208 to 218 may connect the at least one memory 202 with the contact pins 110 to 120 directly.

Besides being called subscriber identity module, also other names and abbreviations may be used. USIM (Universal Subscriber Identity Module) is an application for UMTS running on a UICC (Universal Integrated Circuit Card). Each USIM may be a logical entity on the card 100 storing subscriber-identity-module-specific information and other information. The stored information may include user subscriber information, authentication information, text messages, and phone book contacts. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The wireless communication system may be any standard/non-standard/proprietary radio system that supports the use of the subscriber identity modules 102 to 106 of the card 100. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, or personal communications services (PCS).

When manufacturing the card 100, each of the subscriber identity module chips 102 to 106 may include all the data necessary for a proper operation in its memories. The subscriber identity module chips 102 to 106 may be arranged a in a carrier of the card 100, and electrical coupling between the contact pins 110 to 120 and the plurality of subscriber identity module chips 102 to 106 may be formed by the service provider. The service provider is not illustrated in Figures, but the service provider may be an independent supplier of the card 100 to users.

Operators of different wireless communication systems may provide a service provider with the subscriber identity module chips 102 to 106 which are ready to use. When a subscriber identity module chip 102 to 106 is ready to use it contains subscriber-identity-module-specific data. The operator refers to a mobile telephone company which offers wireless communication services to subscribers. Examples of operators may be Vodaphone, NTT DoCoMo, Elisa, AT&T, for example. In conjunction with each registration to a specific radio system of an operator, a user receives a subscriber identity module which includes information on the user and the operator.

In an embodiment, at least one operator of at least one wireless communication system may provide the service provider with the subscriber identity module chips 102 to 106 with no data or with insufficient data for use. The subscriber identity module chips 102 to 106 may lack operator-specific data and/or user-specific data, for example. The operators may separately provide the lacking data with the service provider, and the service provider may program the data in the at least one memory 202 of the subscriber identity module chips 102 to 106.

The operators of different wireless communication systems may provide the service provider with the subscriber identity module chips 102 to 106 the use of which is programmably and/or structurally blocked. The operators may separately deliver data such as a key code for removing the programmed block and/or instructions for removing the structural block. In this way, the service provider may open and/or authorize the subscriber identity module chips 102 to 106 in the card 100 for use.

Figure 3:
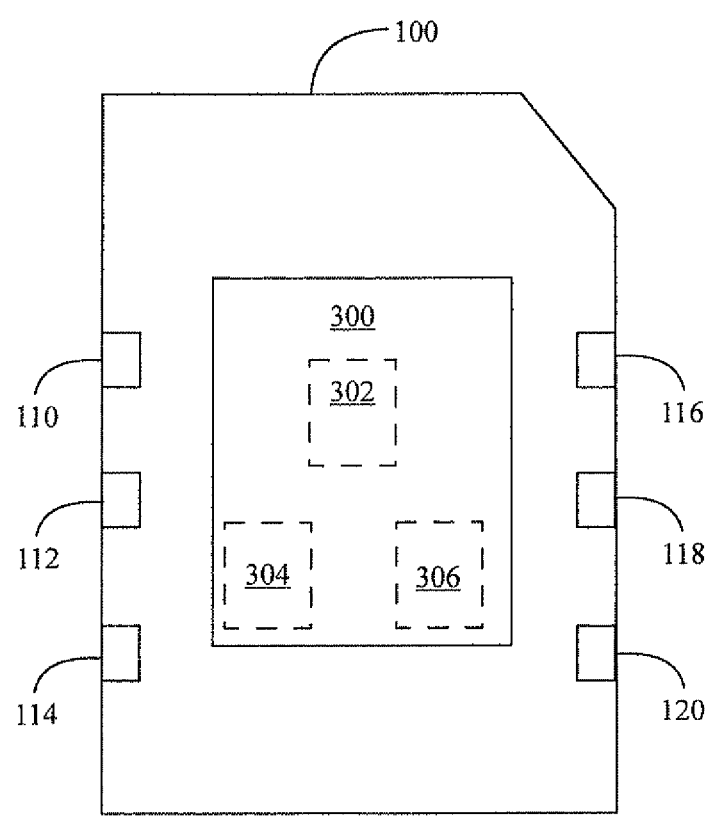
FIG. 3 illustrates a card with an integrated circuit emulating a plurality of SIMs.

FIG. 3 presents an embodiment, where the card 100 may comprise an integrated circuit 300 which may emulate a plurality of the subscriber identity modules 302, 304, 306 of at least one operator of wireless communication in a virtual form. The emulating operational circuitry may comprise the integrated circuit 300 and the contact pins 110 to 120. The integrated circuit 300 may comprise at least one memory and at least one processor to have the required structural and operational complexity associated with the emulation of the plurality of subscriber identity modules. A part of the at least one memory may be protected and a part of the at least one memory may be non-protected which imitates the state of the memories in a plurality of subscriber identity module chips. The at least one memory of the emulating integrated circuit may be divided into different sections, each section being for different operator. Each section may have a different address such that the at least one subscriber identity module may be selected and distinguished from other sections.

Instead of one emulating integrated circuit 300, the card 100 may comprise a plurality of emulating integrated circuits which may emulate each of the plurality of the subscriber identity modules of at least one operator of wireless communication in a virtual form. For example, at least two emulating integrated circuits may be used to emulate one subscriber identity module or three emulating integrated circuits may be used to emulate four subscriber identity modules. The operational circuitry may comprise the contact pins 110 to 120 and the at least one emulating integrated circuit which may comprise at least one memory and at least one processor. Also in this embodiment, a part of the at least one memory may be protected and a part of the at least one memory may be non-protected which imitates the state and operation of the memories in a plurality of subscriber identity module chips.

The at least one integrated circuit 300 emulating subscriber identity modules may be delivered to the service provider without operator specific data. However, the operators may separately deliver to the service provider data for opening and/or authorizing the subscriber identity modules emulated by the at least one integrated circuit in the card 100 for use.

When manufacturing the card 100 having the integrated circuit 300 emulating subscriber identity modules, the service provider may store in the at least one memory of a card 100 subscriber-identity-module-specific data of a plurality of subscriber identity modules associated with at least one operator of wireless communication for causing the card to act as a plurality of subscriber identity modules 302 to 306 of at least one operator of wireless communication systems when the card 100 is used. The service provider may also store in the at least one memory of a card 100 instructions of a computer program, that, when executed by the at least one processor, cause the card to: act as a plurality of subscriber identity modules 302 to 306 of at least one operator of wireless communication systems on the basis of the stored subscriber-identity-module-specific data in the at least one memory.

The at least one integrated circuit 300 may comprise an ASIC (Application-Specific Integrated Circuit), PLD (Programmable Logic Device), FPGA (Field-Programmable Gate Array), embedded microcontroller circuit or the like. The at least one integrated circuit 300 may be implemented in a manner similar to that presented in FIG. 2.

The subscriber-identity-module-specific data of the subscriber identity modules 102 to 106 and the virtual subscriber identity modules 302 to 306 in the at least one integrated circuit 300 may include, for example, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other required data. The subscriber data may also include other carrier-specific data such as the short message service centre (SMSC) number, service provider name (SPN), service dialing numbers (SDN), advice-of-charge parameters, and value added service (VAS) applications. Further information may be found in the GSM Technical Specification 11.11.

Figure 4:
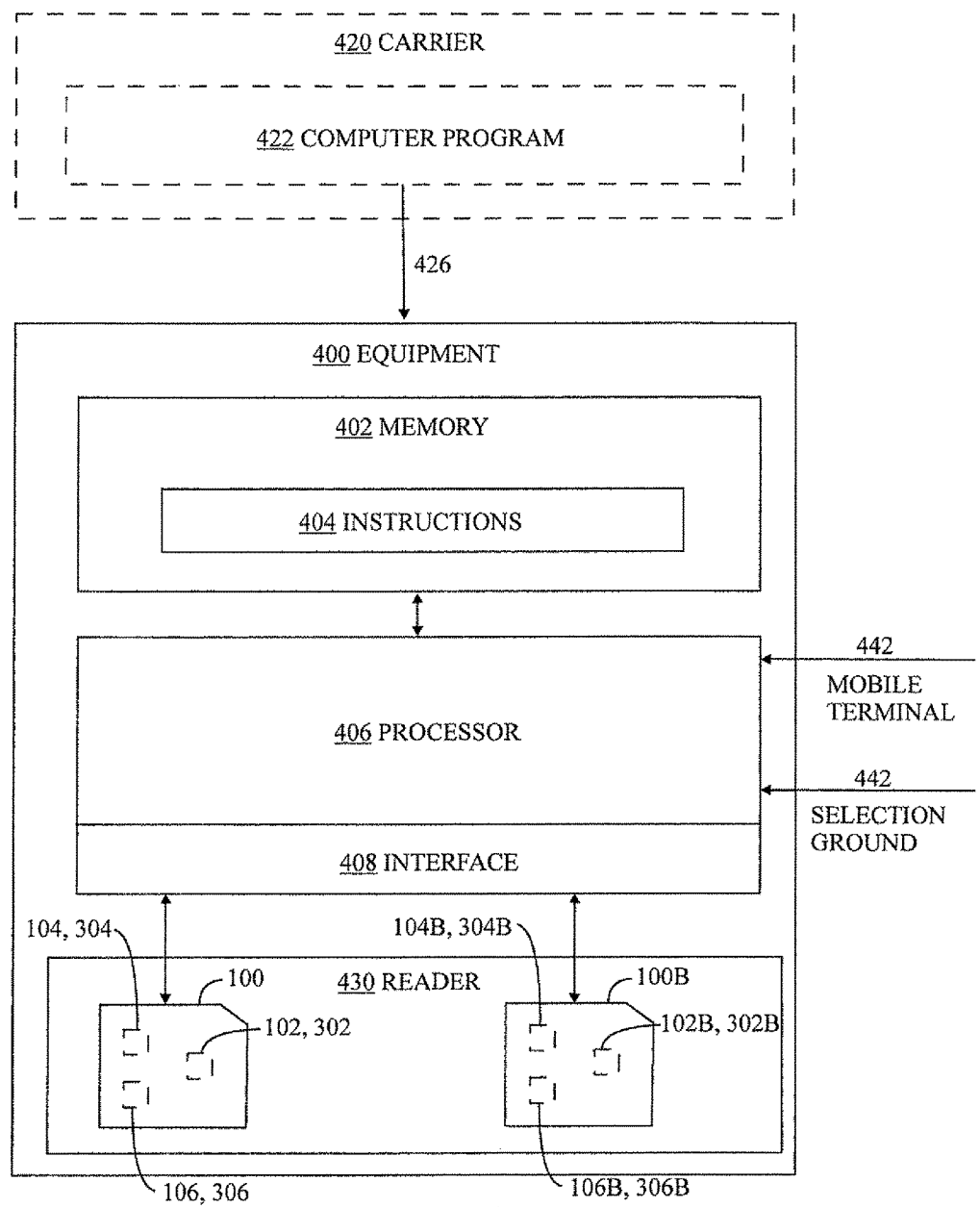
FIG. 4 illustrates equipment having at least one card with a plurality of SIMs.

FIG. 4 presents a block diagram of general equipment which may have the at least one card 100. The equipment 400 may be a mobile terminal 500 like in FIG. 5 or the equipment 400 may comprise two parts like in FIGS. 6, 7 and 8 where at least one of the parts is the mobile terminal 500.

The equipment 400 of FIG. 4 may comprise at least one processor 406, at least one card 100, 100B, a plurality of subscriber identity modules 102 to 106, 102B to 106B associated with the at least one card 100, 100B, and an interface 408 for exchanging data between the a plurality of subscriber identity modules 102 to 106, 102B to 106B associated with the at least one card 100, 100E and the at least one processor 406. Although the subscriber identity modules 102 to 106, 102B to 106B have reference numbers, the subscriber identity modules 102 to 106, 102B to 106B may be real i.e. separate chips or virtual i.e. emulated by the emulating integrated circuit 300 in this case. The subscriber identity modules 102 to 106, 102B to 106B, when the cards 100, 100B are coupled with the equipment 400, may be operationally active parts simultaneously or successively. The interface 108 may or may not include a (contact) smart card reader 430 capable of reading the subscriber data through a coupling between the at least one card 100 and the smart card reader 430.

The equipment 400 also comprises one or more memories 402 for storing instructions 404 of a computer program. The instructions, that, when executed by the one or more processors, cause the equipment 400 to obtain data 440A, 440B from the at least one subscriber identity module 102 to 106, 102B to 106B and control the use of at least one subscriber identity module of a plurality of subscriber identity modules 102 to 106, 102B to 106B of at least one operator of wireless communication associated with the at least one card 100, 100B for wireless communication.

In an embodiment, the instructions 404, when executed by the one or more processors 406, may cause the equipment 400 to obtain data 440A, 440B of the subscriber identity modules 102 to 106, 102B to 106B, obtain selection ground data 444 associated with the subscriber identity modules 102 to 106, 102B to 106B, and select at least one optimal subscriber identity module 102 to 106, 102B to 106B for use by the mobile terminal on the basis of the data 440A, 440B of the subscriber identity modules, and the selection ground data 444 for the subscriber identity modules 102 to 106, 102B to 106B. The data 442 relating to a mobile terminal may also be obtained and it may have effect on the selection.

With this kind of processing, utilization of a wide range of subscriber identity modules becomes possible, and, furthermore, selection of the right subscriber identity module becomes user friendly and automatic (or at least semi-automatic if user interaction is required for the selection or its confirmation). Additionally, the subscriber identity modules 102 to 106, 102B to 106B may easily be carried with because a plurality of subscriber identity modules are in one card similar to a SIM of prior art.

Depending on the processing power needed, the equipment 400 may comprise several processors 406 such as parallel processors or a multicore processor. When designing the implementation of the processor 406, a person skilled in the art will consider the requirements set for the size and power consumption of the equipment 400 of FIG. 4, the necessary processing capacity, production costs, and production volumes, for example. The processor 406 and the memory 402 may be implemented by an electronic circuitry. In an example embodiment, the processor 406 is Freescale™ i.MX233 applications processor such as MCIMX233CJM4C and the memory 402 includes NAND type flash memory such as Micron® MT29F1G08ABADAH4-IT:D, and mobile DDR (=type of double data rate synchronous DRAM) SDRAM such as Micron® MT46H32M16LFBF-6 IT:C.

A non-exhaustive list of implementation techniques for the processor 406 and the memory 402 includes, but is not limited to:

logic components,
    standard integrated circuits,
    application-specific integrated circuits (ASIC),
    system-on-a-chip (SoC),
    application-specific standard products (ASSP),
    microprocessors,
    digital signal processors,
    special-purpose computer chips, and
    field-programmable gate arrays (FPGA).

Similar techniques may be applied in conjunction with the at least one subscriber identity module chip processor 200, memories 202 and the at least one emulating integrated circuit 300. The instructions 404 may be implemented by software and/or hardware. In an example embodiment, the software may be written by a suitable programming language (such as C, C++, or Java), and the resulting executable instructions 404 may be stored in the memory 402 and run by the processor 406.

In an embodiment, the one or more memories 402 may further store instructions 404, that, when executed by the one or more processors 406, cause the equipment 400 to obtain the data of the subscriber identity modules 102 to 106, 102B to 106E by at least one of the following: read the data 440A, 440B from the subscriber identity modules 102 to 106, 102B to 106B, receive the data 440A, 440B wirelessly from a service provider, receive the data 440A, 440B from a user interface manipulated by a user of a mobile terminal.

Various criteria may be used alone or in combination for selecting at least one subscriber identity module 102 to 106, 102B to 106E of the cards 100, 100B. A simple selection ground 444 of the at least one subscriber identity module 102 to 106, 102B to 106E could be formulated as follows: "use the cheapest subscriber identity module of the at least one card that provides the required service at the required quality of service in the present location of the mobile terminal by network operator A if available, and if operator A is not available then by any other operator fulfilling the criteria", but this is only an example embodiment, as the selection ground 444 may be much simpler or much more complex.

The one or more memories 402 store instructions 404, that, when executed by the one or more processors 406, cause the equipment 400 to: obtain data 440A, 440B from the at least one subscriber identity module 102 to 106, 102B to 106B and control the use of at least one subscriber identity module of a plurality of subscriber identity modules 102 to 106, 102B to 106B of at least one operator of wireless communication associated with the at least one card 100, 100B for wireless communication.

In an example embodiment, the one or more memories 402 further store instructions 404, that, when executed by the one or more processors 406, cause the equipment 400 to use at least one (for example SIM 102) of the subscriber identity modules 102 to 106, 102B to 106B as the default subscriber identity module. The instructions 404 may also use the at least one default subscriber identity module (SIM 102 according to the example) after start-up of the mobile terminal. The at least one default subscriber identity module (i.e. SIM 102 according to the example) may, besides being the at least one starting subscriber identity module, be also the at least one controlling subscriber identity module, and possibly also the at least one back-up subscriber identity module. The mobile terminal may use the at least one default SIM (i.e. SIM 102 according to the example) for communication.

In an example embodiment, the equipment 400 may be a mobile wireless communication terminal, a mobile an accessory of a mobile wireless communication terminal, a combination of a mobile wireless communication terminal and an accessory of the mobile wireless communication terminal, an accessory of a mobile terminal, a combination of a mobile terminal and an accessory of the mobile terminal, or a USB (Universal Serial Bus) modem, or any other suitable mobile terminal capable of employing the plurality of subscriber identity modules 102 to 106, 102B to 106B, such as a mobile phone, a tablet pc, a portable computer, or a computer.

Figure 5:
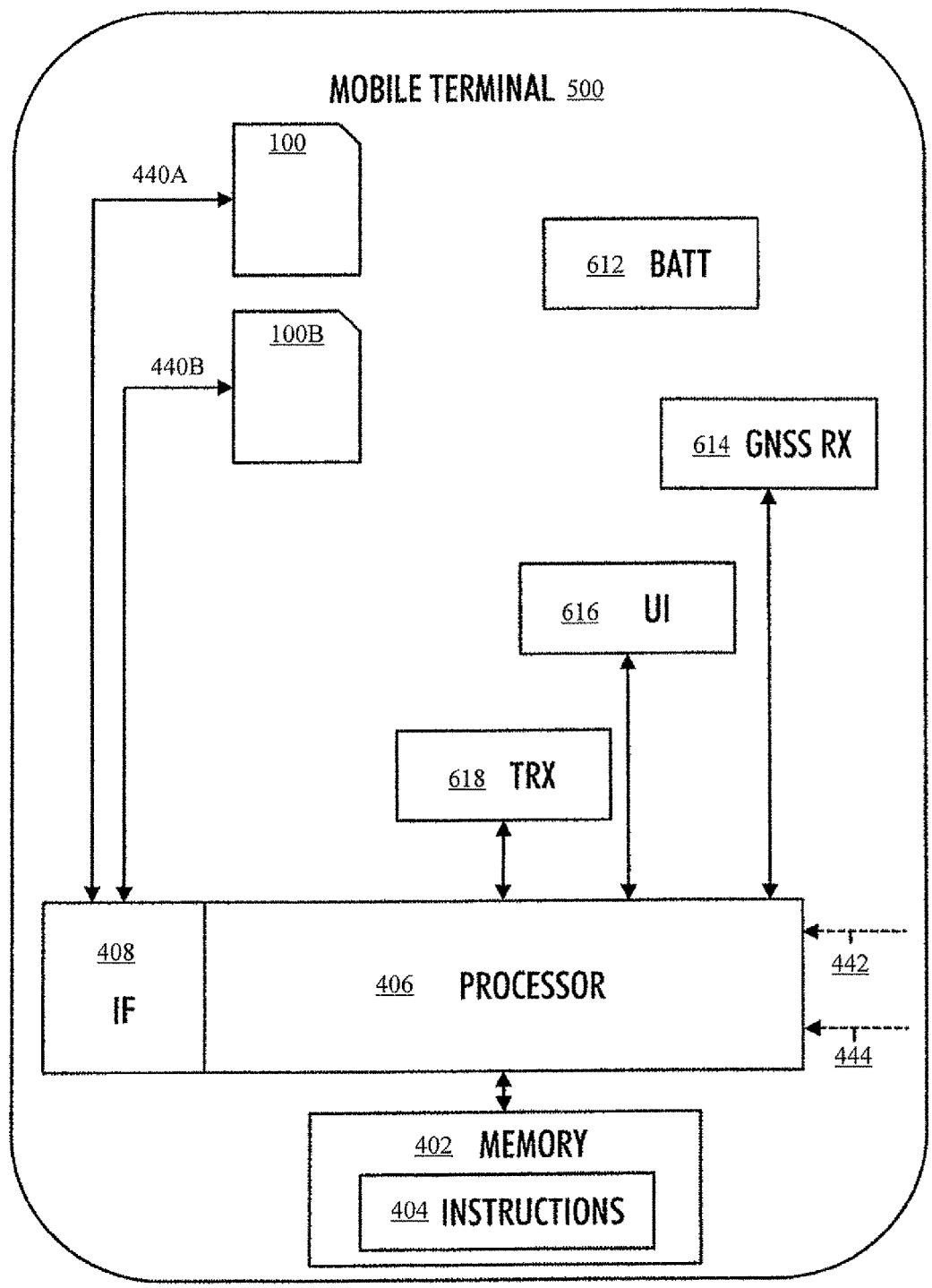
FIG. 5 illustrates a mobile terminal with at least one card having a plurality of SIMs.

FIG. 5 illustrates an example embodiment wherein the functionality of the equipment 400 of FIG. 4 is also implemented to the mobile terminal 500. Consequently, the equipment 400 comprises the interface 408 associated with the plurality of the subscriber identity modules 102 to 106, 102B to 106B of cards 100, 100B, the one or more processors 406, and the one or more memories 402 storing the instructions 404. The mobile terminal 400 may also comprise at least some of other parts 612, 614, 616, 618 as shown in FIG. 5, but explained in relation to FIG. 6.

Figure 6:
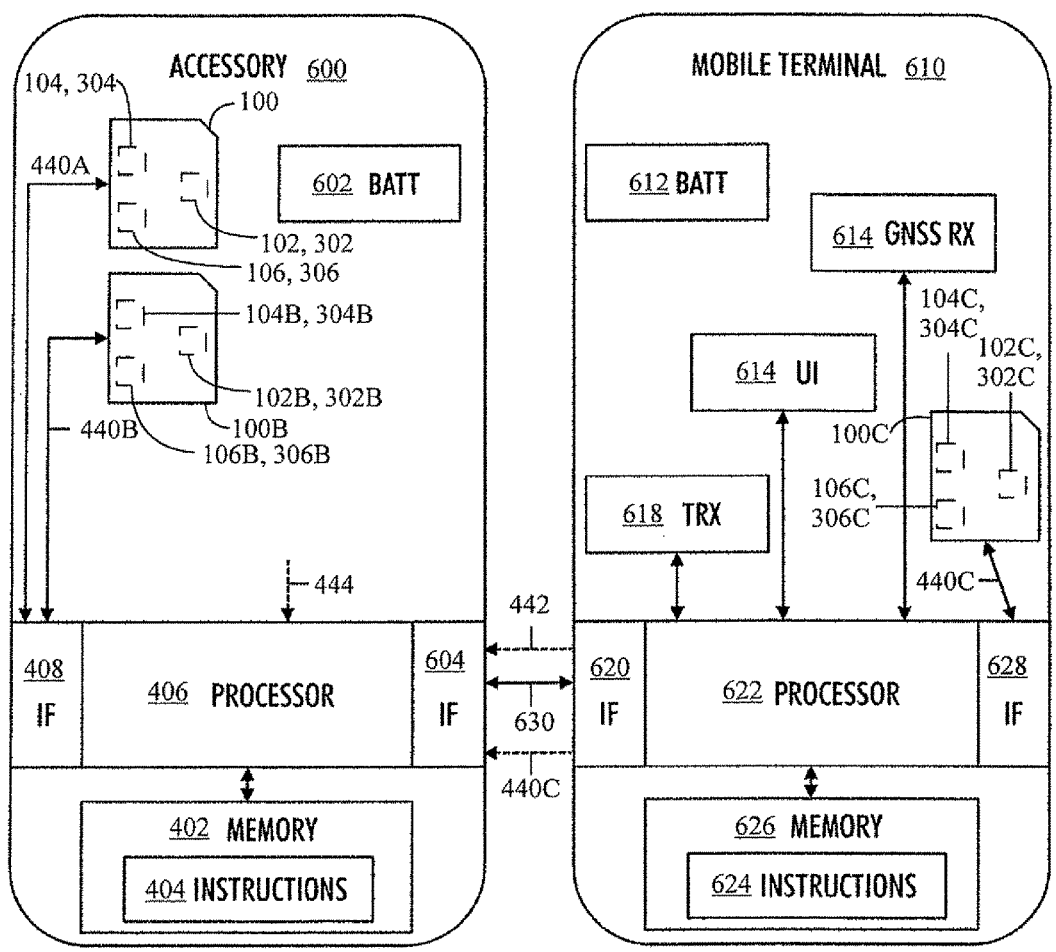
FIGS. 6 to 8 illustrates at least one card with a plurality of SIMs in an accessory of a mobile terminal and/or in a mobile terminal.

FIG. 6 illustrates an example embodiment wherein the equipment 400 of FIG. 4 functionality is implemented in an accessory 600 of a mobile terminal 610. Consequently, the accessory 600 comprises the plurality of the subscriber identity modules 102 to 106, 102B to 106B of the at least one card 100, 100B. The accessory 600 may also comprise the at least one processor 406 and at least one memory 402 with the instructions 404. The card 100C may be similar to either of the cards 100 and 100B and have a plurality of subscriber identity modules 102C to 106C corresponding to subscriber identity modules 102 to 106 or 102B to 106B. However, the card 100C may alternatively be a prior art subscriber identity module card of only one SIM. The card 100C may be taken out from the mobile terminal 610 and inserted in the accessory 600.

The accessory 600 may or may not comprise a battery 602, depending on the power requirements of the accessory 600 and the possibility to obtain electric energy from an external source such as the mobile terminal 610. The (rechargeable) electrical battery 602 is one or more electrochemical cells that convert stored chemical energy into electrical energy. Instead of battery 602, other suitable means may be used to store and/or provide energy.

The interface 408 associated with the subscriber identity modules 102 to 106, 102B to 106B is within the accessory 600, but also another interface 628 associated with the subscriber identity module 102C to 106C possibly located in the mobile terminal 610 may be needed.

Furthermore, both the mobile terminal 610 and the accessory 600 comprise a wired or wireless communication protocol interface 604, 620 which may be standard or proprietary. The communication protocol interface 604, 620 enables two-way communication 630 between the mobile terminal 610 and the accessory 600. In an example embodiment, the interface 604, 620 may be implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), I²C (Inter-Integrated Circuit) or SPI (System Packet Interface). The data 440A of the at least one subscriber identity module 102C to 106C of the card 100C and the data 442 relating to the mobile terminal 610 may be transferred from the mobile terminal 610 to the accessory 600 through the interfaces 604, 620, 628 and potentially through the at least one processor 622.

The instructions 404, when executed by the one or more processors 406 of the accessory 600, cause the accessory 600 to: obtain data 440A, 440B from the at least one subscriber identity module 102 to 106, 102B to 106B and control the use of at least one subscriber identity module of a plurality of subscriber identity modules 102 to 106, 102B to 106B of at least one operator of wireless communication associated with the at least one card 100, 100B for wireless communication.

The instructions 404, when executed by the one or more processors 406 of the accessory 600, cause the accessory 600 to obtain the data 440A, 440B, 440C of the subscriber identity modules 102 to 106, 102B to 102B, 102C to 106C, obtain selection ground data 444 for the at least one subscriber identity module, and select at least one optimal subscriber identity module 102 to 106, 102B to 102B, 102C to 106C of cards 100, 100B, 100C for use by the mobile terminal 610 on the basis of the data 440A, 440B, 440C of the subscriber identity modules, and the selection ground 444 for the subscriber identity module. The data 442 relating to a mobile terminal 610 may also be obtained and it may have effect on the selection.

In an example embodiment, the mobile terminal 610 may be a mobile wireless communications terminal employing a transceiver 618 capable of communicating with a wireless communication system. In an example embodiment, the mobile terminal 610 may be a mobile phone comprising the card 100C comprising a default subscriber identity module 102C, a user interface 616, a battery 612, at least one processor 622 and at least one memory 626 with instructions 624.

The user interface 616 may comprise a display, means for producing sound, a mechanical input means or the like. The display may be a liquid crystal display, an active-matrix of light-emitting diodes or the like, and it may be a touch screen. The means for producing sound may be a loudspeaker or a simpler means for producing beeps or other sound signals. The mechanical input means may comprise a QWERTY keyboard, a keypad and/or a few movable buttons. A parameter, setting or command relating to the described processing of the subscriber identity modules 102 to 106, 102B to 106B, 102C to 106C may be manipulated with the user interface 616.

Furthermore, the mobile terminal 610 may comprise a positioning receiver 614 receiving external location information, which may be utilized to generate location of the mobile terminal 610. The positioning receiver 614 may be a receiver of the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. Besides global navigation satellites, the positioning receiver 614 may also determine its location by utilizing other known positioning techniques. It is well known that by receiving radio signals from several different base stations, a mobile phone may determine its location, for example. The position data may be used as a selection ground data.

In the example embodiment of FIG. 6, the accessory 600 may not comprise a user interface of its own, but the user interaction is performed through the user interface 616 of the mobile terminal 610 as data may be transferred between the accessory 600 and the mobile terminal 610 through the interfaces 604, 620. However, in another example embodiment, the accessory 600 may comprise a user interface as well for outputting and/or inputting data of the described processing of the subscriber identity modules 102 to 106, 102B to 106B, 102C to 106C of the subscriber identity module cards 100, 100B. The user input may be used as a selection ground data.

In the example embodiment of FIG. 6, the equipment 400 of FIG. 4 functionality may be implemented in the accessory 600 such that the instructions 404 are run in the at least one processor 406 of the accessory 600. However, also such an example embodiment is feasible wherein a part of the equipment 400 of FIG. 4 functionality is implemented in the mobile terminal 610 as well such that a part of the instructions 404 are also run in the at least one processor 622 of the mobile terminal 610.

Figure 7:
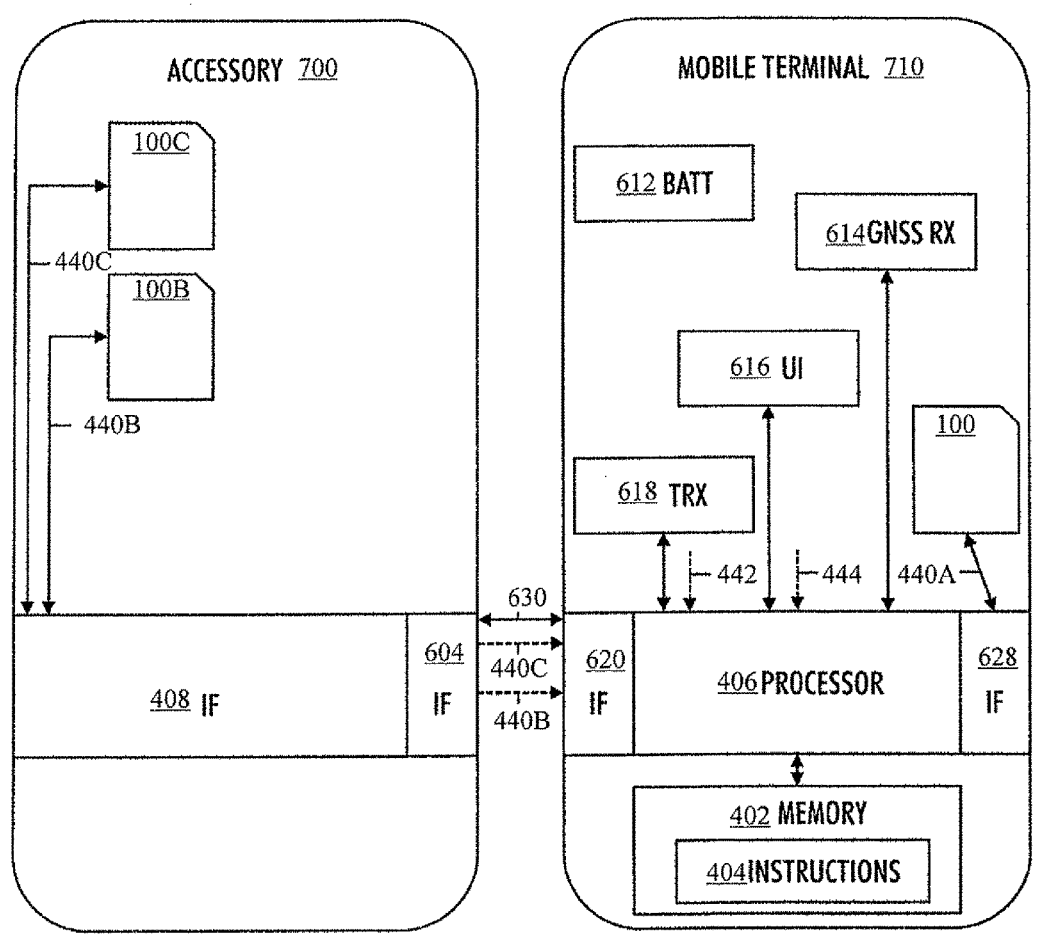

FIG. 7 illustrates an example embodiment wherein the equipment 400 of FIG. 4 functionality is divided between an accessory 700 of a mobile terminal 710 and the mobile terminal 710. Consequently, the accessory 700 comprises the plurality of the subscriber identity modules 102 to 106, 102B to 106B, 102C to 106C of the cards 100, 100B, 100C. The interface 408 associated with the subscriber identity modules 102 to 106, 102B to 106B is within the accessory 700, but also another interface 628 associated with the subscriber identity modules 102C to 106C possibly located in the mobile terminal 710 may be needed. But, as shown in FIG. 7, the accessory 700 may not require a processor or a memory.

The mobile terminal 710 comprises the at least one processor 406 and at least one memory 402 with the instructions 404, and also the other parts 612, 614, 616, 618, 620, 628 as shown in FIG. 7, and explained in relation to FIG. 6.

In the example embodiment of FIG. 7, the accessory 700 is a kind of container including the at least one card 100, 100B of extra subscriber identity modules 102 to 106, 102B to 106B to be used by the mobile terminal 710, but the required processing is performed only in the at least one processor 106 of the mobile terminal 710.

The data 440B, 440C of the subscriber identity modules 102 to 106, 102B to 106B may be transferred from the accessory 700 to the mobile terminal 710 through the interfaces 604, 620.

The instructions 404, when executed by the one or more processors 406 of the mobile terminal 710, cause the mobile terminal 710 obtain data 440A, 440B from the at least one subscriber identity module 102 to 106, 102B to 106B and control the use of at least one subscriber identity module of a plurality of subscriber identity modules 102 to 106, 102B to 106B of at least one operator of wireless communication associated with the at least one card 100, 100B for wireless communication.

The instructions 404, when executed by the one or more processors 406 of the mobile terminal 710, may cause the mobile terminal 710 to obtain the data 440A, 440B, 440C of the subscriber identity modules 102 to 106, 102B to 106B, 102C to 106C, obtain selection ground 444 for the at least one subscriber identity module, and select at least one optimal subscriber identity module 102 to 106, 102B to 106B, 102C to 106C for use by the mobile terminal 710 on the basis of the data 440A, 440B, 440C of the subscriber identity modules, and the selection ground data 444 for the at least one subscriber identity module. The data 442 relating to a mobile terminal 710 may also be obtained and it may have effect on the selection.

Figure 8:
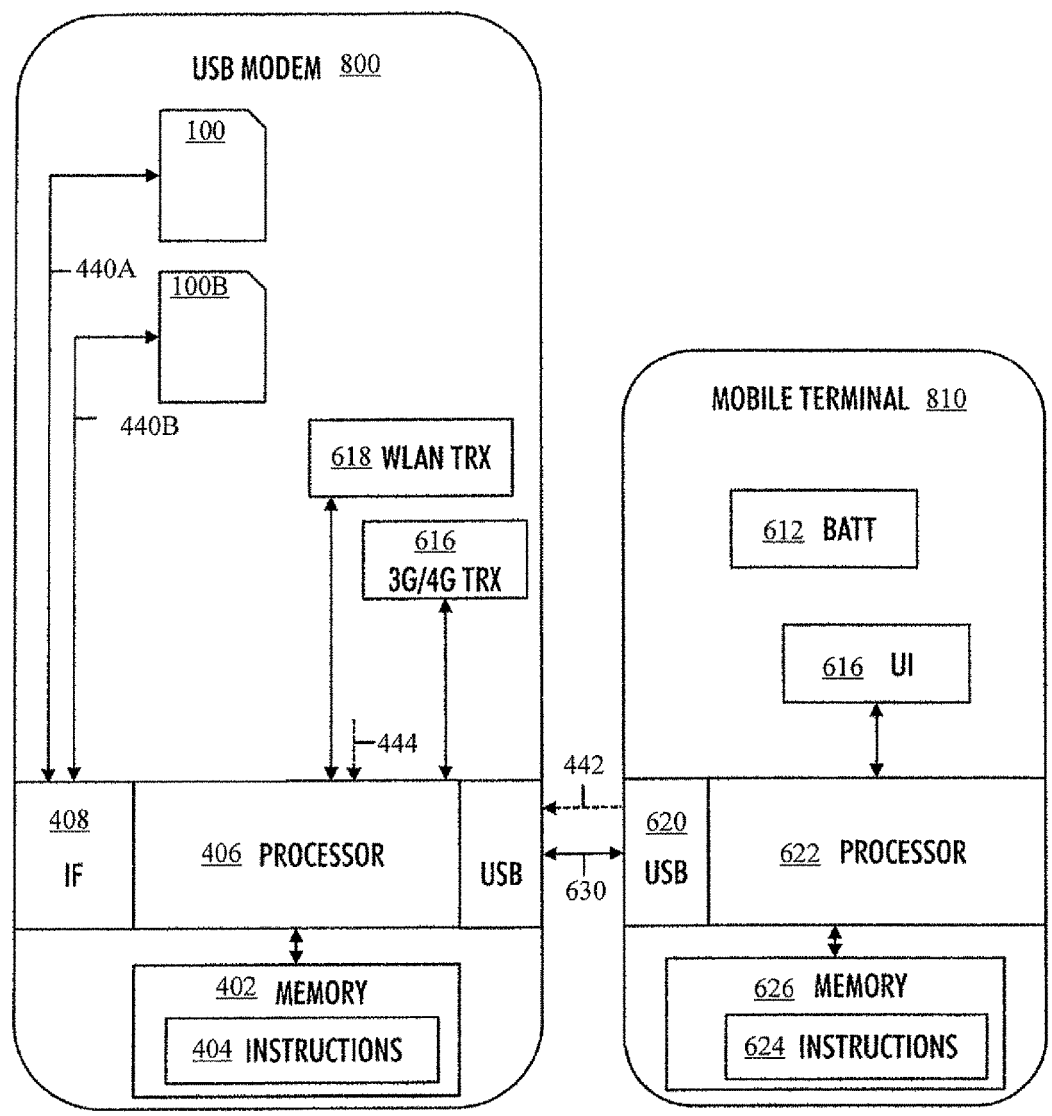

FIG. 8 illustrates an example embodiment wherein the functionality of the equipment 400 of FIG. 4 is implemented in a USB (Universal Serial Bus) modem 800. In this example, the USB modem 800 which may be used as an accessory of a mobile terminal 810. Consequently, the USB modem 800 comprises the plurality of the subscriber identity modules 102 to 106, 102B to 106B of the cards 100, 100B, the interface 408 associated with the subscriber identity modules 102 to 106, 102B to 106B, the at least one processor 406, and at least one memory 402 with the instructions 404.

The USB modem 800 may or may not comprise a battery, depending on the power requirements of the USB modem 800 and the possibility to obtain electric energy from an external source such as a mobile terminal 810.

Furthermore, the USB modem 800 comprises a USB interface 604 capable of being coupled 630 through a USB cable and appropriate connectors to a USB interface 620 of the mobile terminal 810. The data 442 of the mobile terminal 810 may be transferred from the mobile terminal 810 to the USB modem 800 through the interfaces 604, 620.

The instructions 404, when executed by the one or more processors 406 of the USB modem 800, cause the USB modem 800 obtain data 440A, 440B from the at least one subscriber identity module 102 to 106, 102B to 106B and control the use of at least one subscriber identity module of a plurality of subscriber identity modules 102 to 106, 102B to 106B of at least one operator of wireless communication associated with the at least one card 100, 100E for wireless communication.

The instructions 404, when executed by the one or more processors 406 of the USB modem 800, may cause the USB modem 800 to obtain the data 440A, 440B of the subscriber identity modules 102 to 106, 102B to 106B, obtain selection ground data 444 for the at least one subscriber identity module, and select at least one optimal subscriber identity module 102 to 106, 102B to 106B for use by the mobile terminal 810 on the basis of the data 440A, 440B of the subscriber identity modules, and the selection ground data 444 for the at least one subscriber identity module. The data 442 relating to a mobile terminal 810 may also be obtained and it may have effect on the selection.

In an example embodiment, the mobile terminal 810 may be a portable computer, a tablet computer, or any other suitable mobile terminal capable of employing the plurality of subscriber identity modules 102 to 106, 102B to 106B but not necessarily itself including a transceiver capable of communicating with a wireless communication system. Consequently, the mobile terminal 810 may only comprise the battery 612 and the user interface 616 of the other parts of the mobile terminal 610 illustrated in FIG. 6.

In the example embodiment of FIG. 8, the equipment 400 of FIG. 4 functionality may be implemented in the USB modem 800 such that the instructions 404 are run in the at least one processor 406 of the USB modem 800. However, also such an example embodiment is feasible wherein a part of the equipment 400 of FIG. 4 functionality may implemented in the mobile terminal 810 as well such that a part of the instructions 404 are also run in at least one processor 422 of the mobile terminal 810 besides the other instructions 624 stored in at least one memory 626 of the mobile terminal 810.

Figure 9:
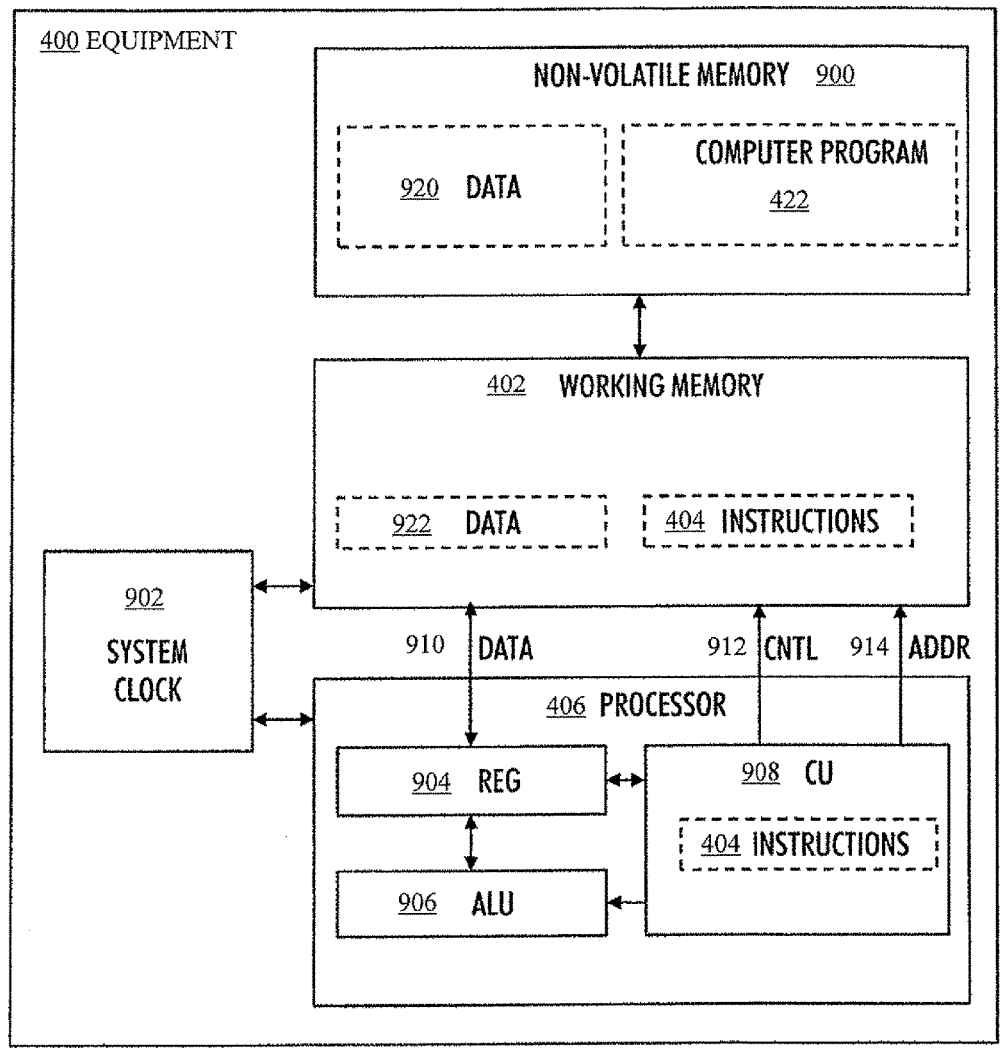
FIG. 9 illustrates the equipment comprising a computer.

FIG. 9 shows an electronic digital computer which is an example of the equipment 400 of FIG. 4. The electronic digital computer, which may comprise, besides the at least one processor 406 and the (working) memory 402, a non-volatile memory 900, and a system clock 902. Naturally, the computer may comprise a number of other peripheral devices, not illustrated here for the sake of clarity.

In an example embodiment, the system clock 902 constantly generates a regular stream of electrical pulses, which cause the various transferring operations within the computer to take place in an orderly manner and with deterministic timing.

In an example embodiment, the at least one processor 406 may be implemented as a microprocessor implementing functions of a central processing unit (CPU) on an integrated circuit. The CPU is a logic state machine executing a computer program 422, which comprises the program instructions 404. The instructions 104 may be coded as a computer program using a programming language, which may be a high-level programming language, such as C, or Java, or a low-level programming language, such as a machine language, or an assembler. The CPU may comprise a set of registers 904, an arithmetic logic unit (ALU) 906, and a control unit (CU) 908. The control unit 908 is controlled by a sequence of instructions 404 transferred to the CPU from the working memory 402. The control unit 908 may contain a number of microinstructions for basic operations. The implementation of the microinstructions may vary, depending on the CPU design. The microprocessor 406 may also have an operating system (a dedicated operating system of an embedded system, or a real-time operating system), which may provide the computer program 422 with system services.

In an example embodiment, there may be three different types of buses between the working memory 402 and the at least one processor 406: a data bus 910, a control bus 912, and an address bus 914. The control unit 908 uses the control bus 912 to set the working memory 402 in two states, one for writing data into the working memory 402, and the other for reading data from the working memory 402. The control unit 908 uses the address bus 914 to send to the working memory 402 address signals for addressing specified portions of the memory in writing and reading states. The data bus 910 is used to transfer data 922, such as data 440A, 440B, 440C, 442, 444 between the working memory 402 to the at least one processor 406, and to transfer the instructions 404 from the working memory 402 to the at least one processor 406. During running of the program 422, the instructions 404 may be transferred via the data bus 910 from the working memory 402 into the control unit 908, wherein usually a portion of the instructions 404 resides and controls the operation of the equipment 400 of FIG. 4.

In an example embodiment, the working memory 402 may be implemented as a random-access memory (RAM), where the information is lost after the power is switched off. The RAM is capable of returning any piece of data in a constant time, regardless of its physical location and whether or not it is related to the previous piece of data. The data may comprise data 440A, 440B, 440C, 442, 444 and any other permanent or temporary data needed during the processing, program instructions etc.

In an example embodiment, the non-volatile memory 900 retains the stored information even when not powered. Examples of non-volatile memory include read-only memory (ROM), flash memory, magnetic computer storage devices such as hard disk drives, and optical discs. As is shown in FIG. 9, the non-volatile memory 900 may store both data 920 and the computer program 422 comprising the instructions 404.

In principle, what is written about the at least one processor 406 and the memories above is true for the at least one processor 200 and the memories 202 of a SIM irrespective of whether they are real or virtual.

An example embodiment provides a computer program 422 comprising the instructions 404 which, when loaded 426 into the equipment 400 of FIG. 4, cause the equipment 400 of FIG. 4 to obtain data 440A, 440B, 440C of the subscriber identity modules 102 to 106, 106B to 106B, 102C to 106C in cards 100, 100B, 100C, obtain selection ground data 444 associated with the at least one subscriber identity module, and select at least one optimal subscriber identity module 102 to 106, 102B to 106B, 102C to 106C for use by the mobile terminal on the basis of the data 440A, 440B, 440C of the subscriber identity modules, and the selection ground data 444 for the subscriber identity module. The data 442 relating to a mobile terminal may also be obtained and it may have effect on the selection.

In an example embodiment, the computer program 422 may be in source code form, object code form, or in some intermediate form. The computer program 422 may be stored in a carrier 420, which may be any entity or device capable of carrying the program 422 to the equipment 400 of FIG. 4. The carrier 420 may be a computer-readable storage medium. Besides this, the carrier 420 may be implemented as follows, for example: the computer program 422 may be embodied on a record medium, stored in a computer memory, embodied in a read-only memory, and/or embodied on a software distribution medium. The carrier 420 may also be carried on the telecommunications signal. The medium 420 may be a non-transitory computer-readable storage medium.

FIG. 4 illustrates an example embodiment in which the carrier 420 may be coupled 426 with the equipment 400 of FIG. 4, whereupon the program 422 comprising the instructions 404 is transferred into the (working) memory 402, and possibly also into the non-volatile memory 900. The program 422 with its instructions 404 may be loaded from the non-volatile memory 900 into the working memory 402 as needed.

Figure 10:
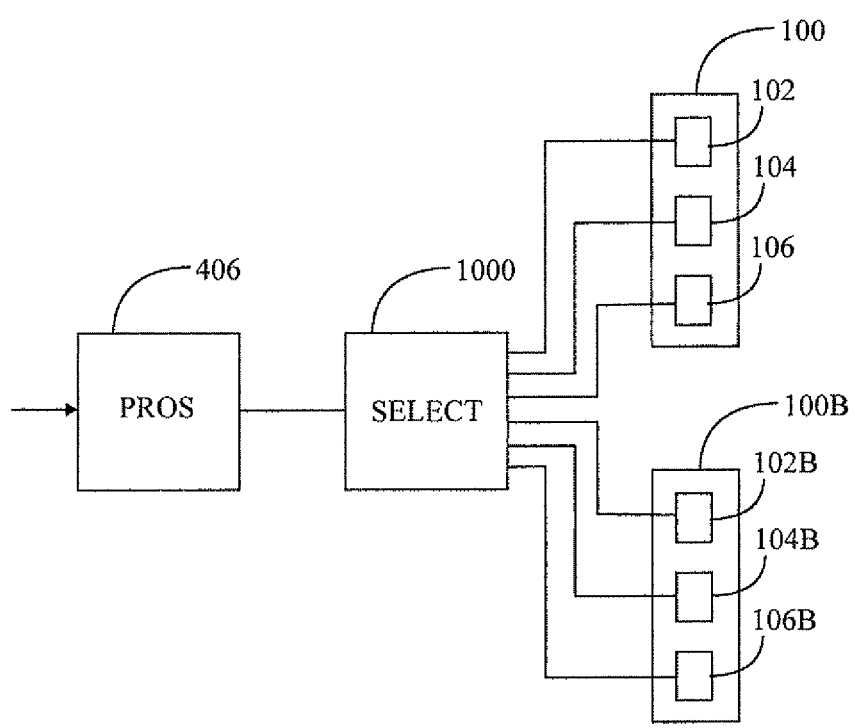
FIG. 10 illustrates selection of at least one SIM from a plurality of SIMs.

FIG. 10 presents a principle of selection of at least one subscriber identity module 102 to 106, 102B to 106B for use on the basis of selection data. The at least one identifier may be formed in the at least one processor 406 on the basis of the data 440A, 440B, 440C of the subscriber identity modules, the data 442 relating to the mobile terminal, and the selection ground data 444 for the subscriber identity module. The data 440A, 440B, 440C of the subscriber identity modules and the data 442 relating to the mobile terminal may remain constant but the selection ground data 444 may vary. The computer program 422 comprising the instructions 404 which, when loaded 426 into the equipment 400 of FIG. 4, cause the equipment 400 of FIG. 4 to form the at least one identifier on the basis of the selection ground 444. However, the data 440A, 440B, 440C of the subscriber identity modules and the data 442 relating to the mobile terminal may also have effect on the formation of the at least one identifier. The selector circuit 1000 may, on the basis of the at least one identifier, then enable data transfer between the desired at least one subscriber identity module 102 to 106, 102B to 106B and the at least one processor 106 for wireless communication of the equipment 400. Hence, the at least one subscriber identity module 102 to 106, 102B to 106B may be programmably selected for use. Similarly, the at least one subscriber identity module 102 to 106, 102B to 106B may programmably be deselected when a new selection ground 444 is available or obtained and at least one new identifier is formed. Each subscriber identity module 102 to 106, 102B to 106B may be addressed using an identifier referring to the subscriber identity module 102 to 106, 102B to 106B.

In an embodiment, the selector circuit 1000 may be a part of the equipment 400 outside the at least one card 100, 100B, 100C. In an embodiment, the selector circuit 1000 may be a part of each card 100, 100B, 100C. In an embodiment, the selector circuit 1000 may reside partly in the equipment 400 outside the at least one card 100, 100B, 100C and partly in each card 100, 100B, 100C. The selector circuit 1000 may comprise logic gates which enable communication between the at least one processor 406 and the at least one selected subscriber identity module by opening a proper coupling therebetween irrespective whether the at least one selected subscriber identity module is real or virtual. The selector circuit 1000 may be realized using combinational logic and/or sequential logic.

Figure 11:
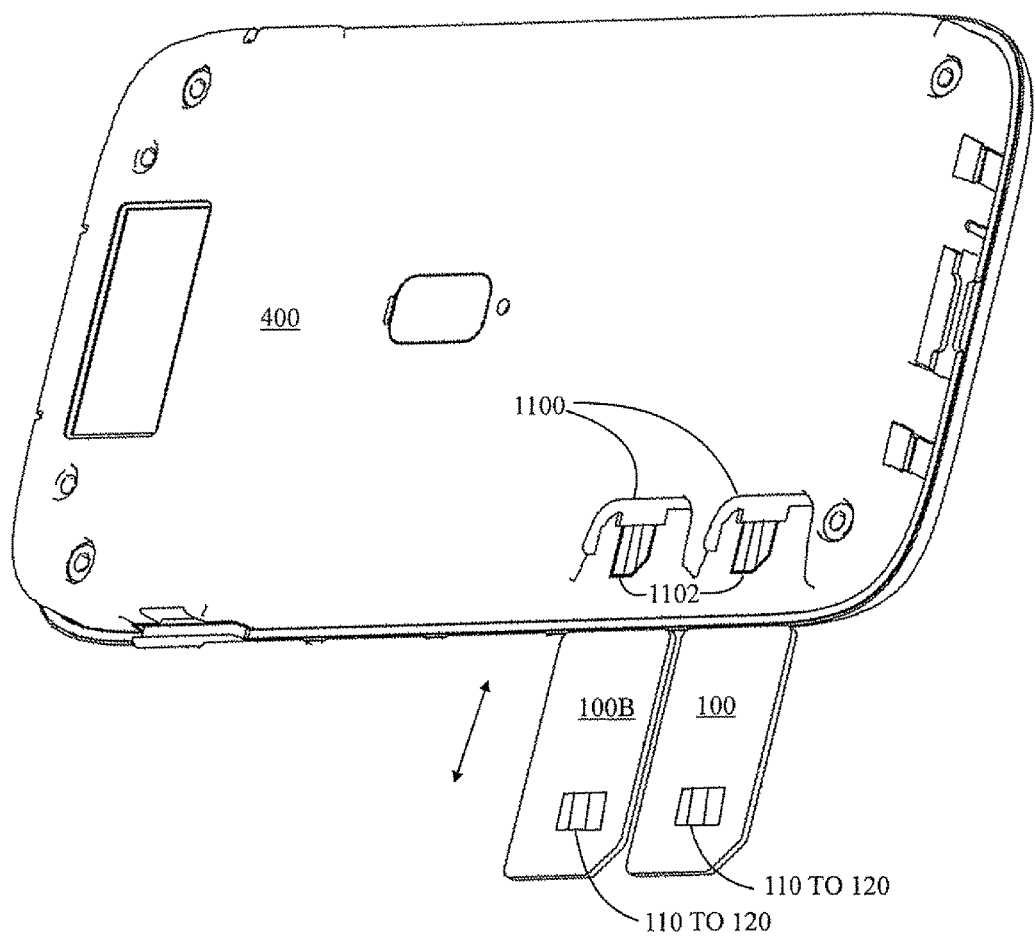
FIG. 11 illustrates a mechanical structure of the equipment.

FIG. 11 presents mechanics of the equipment 400 associated with wireless communication. The equipment 400 may be the mobile terminal 500, 610, 710, 810, the accessory 600, 700 or the USB modem 800. The equipment 400 comprises also pockets 1100 for the at least one card 100, 100B. The number of pockets may be one or more. The pockets 1100 may be arranged parallel or in some other manner in the equipment 400.

Each pocket 1100 may have an empty space the size and shape of which may closely correspond to those of the card 100, 100B. Each pocket 1100 has electrical contact electrodes 1102 for coupling with contact pads 110 to 120 of the card 100, 100B. The electrical contact electrodes 1102 are in electrical connection with the operational circuitry of the card 100, 100B. The at least one card 100, 100B is removably attachable to the equipment.

The equipment 400 may be made thin and pocket sized and the equipment 400 may thus also be portable like present mobile phones, for example. Here thin means a thickness of less than about 2.5 cm, and often 0.5 cm to 2 cm. Other dimensions of the equipment 400 are defined by the outer structures and they may be about 5 cm to 20 cm×4 cm to 15 cm, for example. The equipment 400 may comprise or may be made of plastic, composite, ceramics or metal, for example.

FIG. 12 presents a manufacturing method of the card comprising a plurality of subscriber identity module irrespective whether they are real or virtual. In step 1200, subscriber-identity-module-specific data of a plurality of subscriber identity modules associated with at least one operator of wireless communication and instructions, that, when executed by the processing means, cause the card to: act as a plurality of subscriber identity modules of the operators of wireless communication systems on the basis of the stored subscriber-identity-module-specific data in the at least one memory, are stored in the at least one memory of the card.

FIG. 13 presents a manufacturing method of the card comprising a plurality of real subscriber identity modules. In step 1300, a plurality of subscriber identity module chips are arranged in a carrier of the card. In step 1302, electrical coupling is formed between the contact pins and the plurality of subscriber identity module chips.

FIG. 14 presents a manufacturing method of the card comprising a plurality of virtual subscriber identity modules. In step 1400, subscriber-identity-module-specific data of a plurality of subscriber identity modules are stored in the at least one memory of at least one emulating integrated circuit of the card for emulating the subscriber identity modules in the card virtually.

Wireless communication devices develop rapidly. Therefore, all words and expressions should be interpreted broadly and they are intended to illustrate, not to restrict, the embodiments presented above. It will be obvious to a person skilled in the art that, as technology advances, the inventive concept can be implemented in various ways. The invention and its embodiments are not limited to the examples described above but may vary within the scope of the claims.

The invention claimed is:

1. A single SIM (subscriber identity module) card apparatus configured to attach to an electronic device associated with a wireless communication of a radio system operated by at least one operator, the single SIM card apparatus comprising:
   an operational circuitry that includes contact pins, a first memory, and a first processor;
   a plurality of separate SIM chips, each including at least one SIM of a plurality of SIMs associated with the at least one operator;
   wherein:
   the single SIM card apparatus having a standard SIM card shape;
   the contact pins electrically couple the electronic device with the operational circuitry;
   the first memory is configured to store SIM-specific data of at least two SIMs associated with the at least one operator;
   the single SIM card apparatus is configured to function as one of the plurality of the SIMs of the at least one operator when communicating between the electronic device and the single SIM card apparatus;

the operational circuitry comprises electrical circuits of the separate SIM chips, each of the plurality of separate SIM chips individually functioning as a SIM of the plurality of SIMs, and each of the plurality of separate SIM chips is issued from the at least one operator.

2. The single SIM card apparatus of claim 1, wherein the first memory is configured to store instructions, that, when executed by the first processor, cause the single SIM card apparatus to function as one of the SIMs, which is issued from the at least one operator on a basis of the stored SIM-specific data in the first memory.

3. The single SIM card apparatus of claim 1, wherein the single SIM card apparatus is configured to receive selection data through the contact pins, and the first memory is configured to store instructions, that, when executed by the first processor, cause the single SIM card apparatus to use the at least one of the plurality of the SIMs on a basis of the selection data for mobile communication.

4. The single SIM card apparatus of claim 1, wherein the single SIM card apparatus is configured to receive at least one identifier referring to the at least one of the plurality of the SIMs through the contact pins, and the first memory is configured to store instructions, that, when executed by the first processor, cause the single SIM card apparatus to use the at least one SIM on a basis of the at least one identifier for mobile communication.

5. An apparatus configured to accept at least one card in an attachable manner, each of the at least one card comprising the single SIM card apparatus as claimed in claim 1, the apparatus configured to accept the at least one card comprising;

contact electrodes for electrical coupling between the apparatus configured to accept the at least card;

one or more additional processors;

one or more additional memories of the apparatus configured to accept the at least one card storing instructions, that, when executed by the one or more additional processors, cause the apparatus configured to accept the at least one card to:

obtain data from the at least one of the plurality of SIMs, which is issued from the at least one operator associated with the at least one card for wireless communication and control the use of the at least one SIM.

6. The apparatus of claim 5, wherein the apparatus is configured to accept the at least one card comprises an interface associated with the plurality of SIMs;

the one or more additional memories store instructions, that, when executed by the one or more additional processors, cause the apparatus configured to accept at least one card to:

obtain selection ground data from the interface; and control the use of the at least one SIM associated with the at least one card on a basis of the selection ground data.

7. The apparatus of claim 5, wherein the apparatus configured to accept the at least one card comprises:

a selector circuit; and the one or more additional memories of the apparatus configured to accept the at least one card to store instructions, that, when executed by the one or more additional processors, cause the apparatus configured to accept the at least one card to form at least one identifier addressing at least one SIM on a basis of the selection ground data and output the formed at least one identifier to the selector circuit;

wherein:

the selector circuit is configured to select the least one SIM in use on a basis of the at least one identifier.

8. A method of manufacturing the single SIM card apparatus of claim 1, the method comprising:

storing, in the memory of the single SIM card apparatus, SIM-specific data of a plurality of SIMs associated with the at least one operator for causing the single SIM card apparatus to function as one of the plurality of the SIMs of the at least one operator when using the single SIM card apparatus.

9. The method according to claim 8, the method comprising:

storing, in the first memory of the single SIM card apparatus, instructions, that, when executed by the first processor, cause the single SIM card apparatus to function as a plurality of SIMs of the at least one operator on a basis of the stored SIM-specific data in the memory.

10. A method of manufacturing the single SIM card apparatus of claim 1, the method comprising:

arranging the plurality of separate SIM chips in a carrier structure of the single SIM card apparatus and forming electrical coupling between the contact pins and the plurality of separate SIM chips.

11. A method of manufacturing the single SIM card apparatus of claim 1, the method comprising:

storing SIM-specific data of the plurality of SIMs in at least one memory of at least one emulating integrated circuit of the single SIM card apparatus for emulating the SIMs in the single SIM card apparatus virtually.

12. A method of manufacturing the single SIM card apparatus of claim 1, the method comprising:

receiving authorization for use of the at least one of the separate SIM chips from the at least one operator.

13. The single SIM card apparatus of claim 1, wherein each of the separate SIM chips has a size smaller than the single SIM card apparatus and the each of the separate SIM chips do not have a standard SIM card shape.

* * * * *